No. 612,414. Patented Oct. 18, 1898.
A. H. HALL.
CHECK VALVE FOR GAS PIPES.
(Application filed July 28, 1897.)
(No Model.)
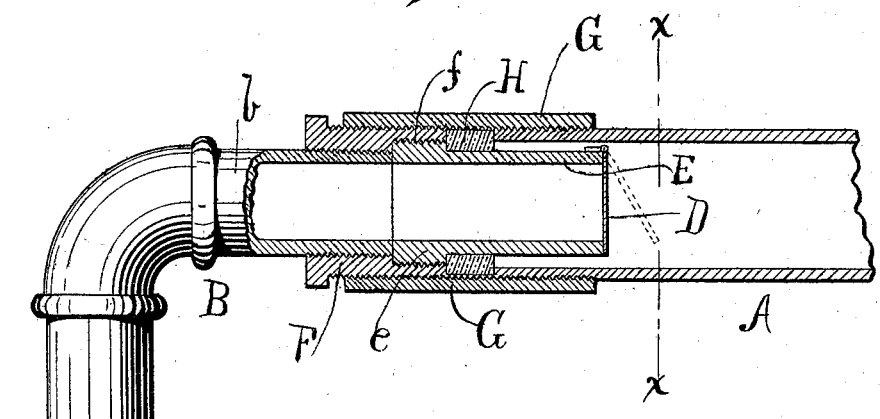
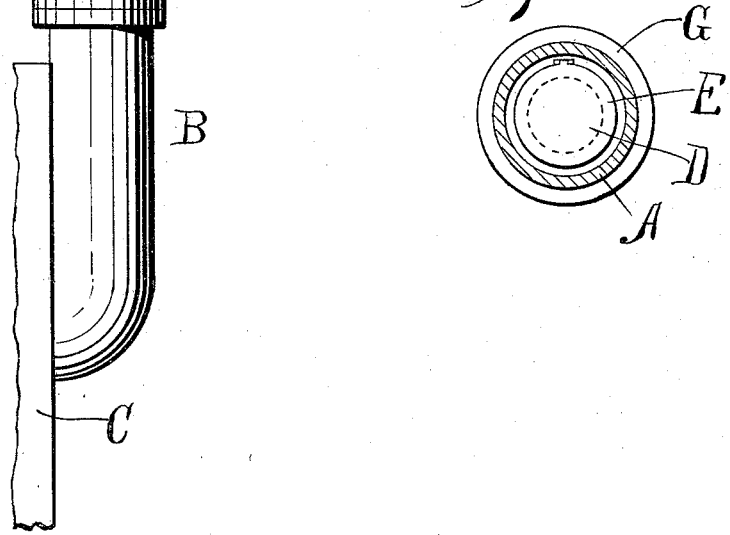
WITNESSES:
INVENTOR
A. H. Hall
BY
ATTORNEYS

UNITED STATES PATENT OFFICE.

ALBERT HENRY HALL, OF NEW YORK, N. Y., ASSIGNOR OF TWO-THIRDS TO LOUIS ZIMMER, OF SAME PLACE.

CHECK-VALVE FOR GAS-PIPES.

SPECIFICATION forming part of Letters Patent No. 612,414, dated October 18, 1898.

Application filed July 28, 1897. Serial No. 646,181. (No model.)

*To all whom it may concern:*

Be it known that I, ALBERT HENRY HALL, a citizen of the United States, and a resident of New York, (Brooklyn,) county of Kings, and State of New York, have invented certain new and useful Improvements in Check-Valves for Gas-Pipes, of which the following is a specification, reference being had to the accompanying drawings, forming a part thereof, in which similar letters of reference indicate corresponding parts.

This invention relates to improvements in gas-governors; and the objects thereof are to supply an efficient means for maintaining uniformity of pressure to the burners and to prevent the gas from returning to the meter after it has once passed through and into the house or service pipes, whereby it is not possible for the gas to pass back through the meter and reregister.

The invention will be hereinafter fully described, and specifically set forth in the annexed claim.

In the accompanying drawings, forming part of this specification, Figure 1 is a side elevation, partly in section, illustrating my invention in connection with an outlet-pipe of a gas-meter; and Fig. 2 is a cross-sectional elevation taken on the line $x$ $x$ of Fig. 1.

In the practice of my invention I form at the point of juncture between the house-pipe A and the outlet-pipe B, leading from the meter C, a valve D. This said valve may be of any suitable form adapted to be normally closed by back pressure of gas located within the house-pipe A or the branches leading therefrom.

The valve preferably used is a flap or disk valve hinged to a tube E. This said tube has a threaded flange $e$ at the inner end thereof which engages with a threaded recess $f$ of a cylindrical coupling F. This said coupling is threaded to the section $b$ of the outlet-pipe B, and it is supplied with an outer thread which engages with the corresponding threads of the collar G, said collar also engaging with the house-pipe A, and to maintain a gas-tight joint a flexible washer H is placed between the end of the pipe A and the coupling F.

In the operation and use of the device the pressure of gas as it leaves the meter will maintain the valve D in an open position approximately, as illustrated by dotted lines in Fig. 1 of the drawings, while the gas is being burned or exhausted from the pipe A, and it will be impossible to exhaust the pipes from the source of gas-supply as the pressure of the gas would close the valve and the practice of drawing gas back through the meter and allowing it to reregister be prevented.

I do not confine myself to the specific details of mere mechanical construction as herein shown and described, as it is obvious that under the scope of my invention I am entitled to slight structural variations.

Having thus described my invention, what I claim as new, and desire to secure by Letters Patent, is—

As a check-valve for gas-pipes, the combination of a valved tube, said tube having at its outer end a threaded flange, a coupling having a threaded recess in one end adapted to receive and connect it with said tube and adapted to screw upon the supply-pipe, an annular ring-packing of flexible material adapted to fit snugly over said tube and be confined by said tube-flange and the end of the house-pipe, and a tubular collar adapted to thread over the outside of said house-pipe and said coupling, as and for the purpose set forth.

In testimony that I claim the foregoing as my invention I have signed my name, in presence of two witnesses, this 24th day of July, 1897.

ALBERT HENRY HALL.

Witnesses:
 B. McCOMB,
 E. SEIDLER.